Nov. 9, 1954     P. W. DEAN     2,693,947
GAS MANUFACTURE
Filed Dec. 7, 1951     2 Sheets-Sheet 2
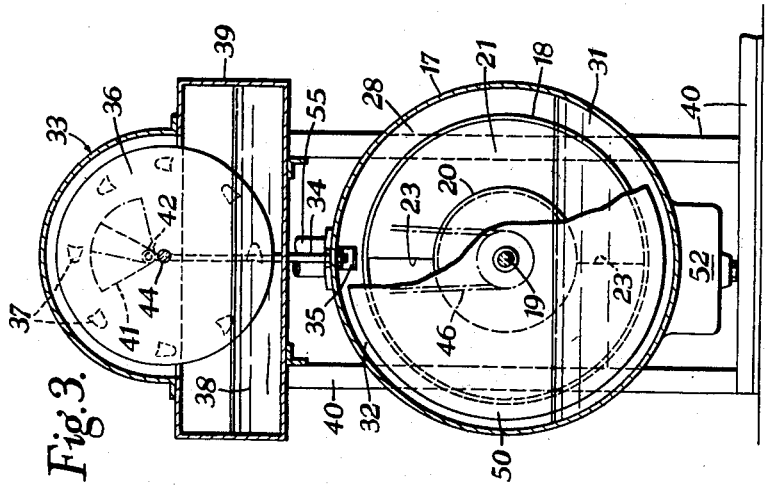
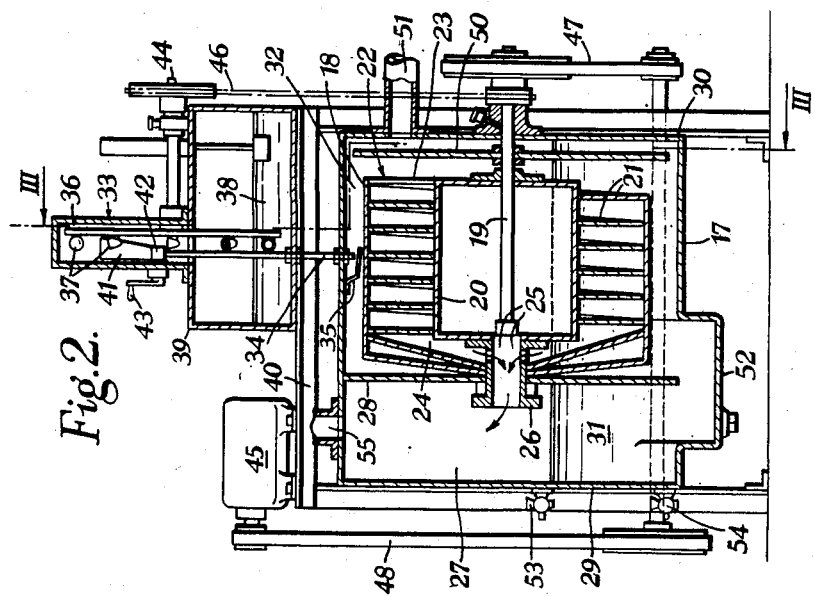
INVENTOR:
Percy Wheatley DEAN
Attorney

United States Patent Office 2,693,947
Patented Nov. 9, 1954

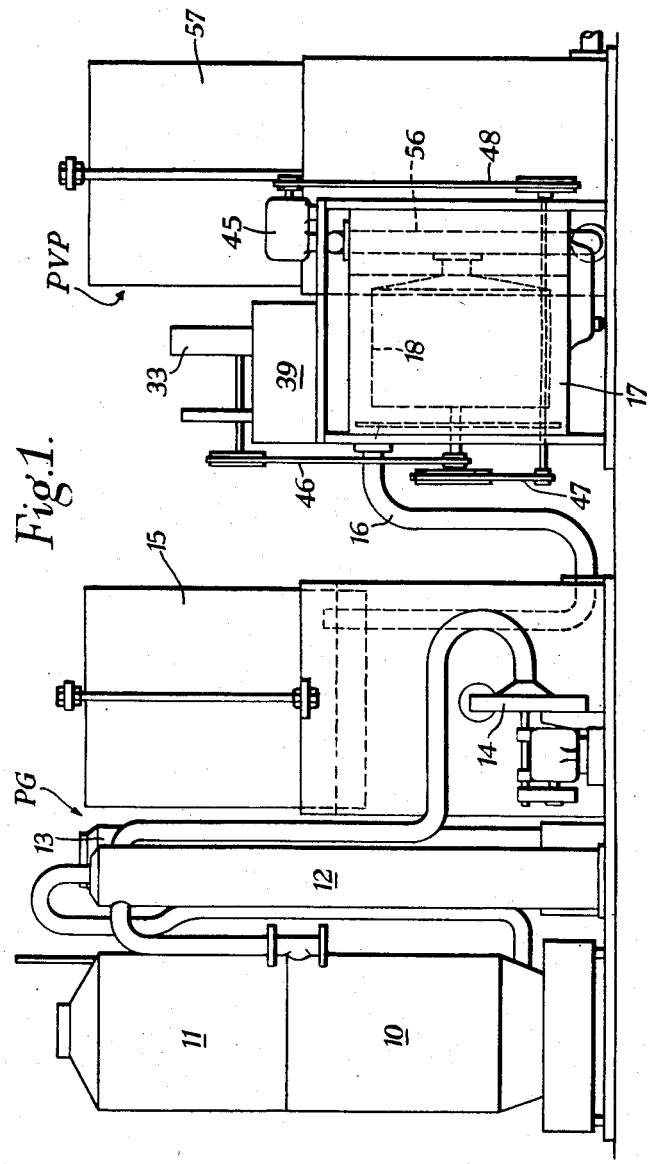

2,693,947

GAS MANUFACTURE

Percy Wheatley Dean, Sutton, England, assignor to The Aerogen Company Limited, Hampshire, England, a British company Application December 7, 1951, Serial No. 260,540

Claims priority, application Great Britain March 16, 1951

3 Claims. (Cl. 261—18)

This invention relates to gas manufacture and is more particularly concerned with an improved means for producing a combustible gas which is a close equivalent to or substitute for ordinary town gas whereby gas-operated appliances of all kinds, although designed for use with such town gas, may also be operated with gas made according to the present invention without modification.

An object of the present invention is the production in an inexpensive and efficient manner of a combustible gas serving as a near equivalent of or a substitute for town gas under conditions where a constant supply of producer gas or other suitable hydrogen-containing gas is available or where such hydrogen-containing gas may be locally generated.

Broadly, the present invention comprises a combination of apparatus for vaporizing petrol by the wet carburation method, promoting mixing of the vapour with producer gas, hydrogen or a suitable hydrogen-containing gas such as town gas or coal gas, and extracting the gas-vapour mixture through means, which, by creating turbulence between the gas mixture and a washing liquid, effect washing and further mixing of the gas-vapour mixture. Preferably, the apparatus also includse means for removing water vapour and entrained impurities from the hydrogen-containing gas before substantial mixing with the petrol vapour.

In this specification the term "petrol" is to be interpreted with the meaning current in Great Britain, e. g. motor spirit, and synonymous with the terms "gasoline" in the United States and other countries, "benzoline" in Australia and so on and is to be construed as including other similar volatile hydrocarbons.

A preferred form of apparatus according to the invention comprises a vapourizing chamber in combination with a petrol vapourizing device of the wet carburation type, means for introducing the gas which is to be admixed therewith into the vapourizing chamber, and a rotary gas washing and mixing drum partially immersed in a water bath in said vapourizing chamber and having internally means for creating turbulence between the water and the gas-vapour mixture. More specifically, the rotary washing and mixing drum also provides a constantly moistened surface serving as the vapourizing surface for the petrol.

Where there is no large scale supply of producer gas or other suitable gas, such gas may be generated in a portable generator coupled to the vapour gas mixing apparatus.

A further feature of the apparatus according to the invention consists in the provision of means for trapping the fine dust and removing water vapour which is usually present in any normally available producer gas, before mixing with petrol vapour. Such means may comprise a rotary plate or disc moving in unison with the washing and mixing drum and arranged to present a cooled and wetted surface to the incoming hydrogen-containing gas.

Means are also provided whereby the proportion of petrol vapour to producer gas in the resultant mixture may conveniently be adjusted in accordance with requirements or to compensate for variations in character of the petrol used or producer gas available.

In order that the various features of the invention may be readily understood it will now be described with reference to the accompanying drawing in which:

Fig. 1 is a side elevation, with parts shown in section, of a plant for producing gas in accordance with the invention.

Fig. 2 is a longitudinal vertical cross-sectional view of the petrol vapourizing device while Fig. 3 is a transverse cross-sectional view taken on the line III—III of Fig. 2.

Referring to the drawings, the producer gas section of the plant shown at PG may be of any convenient form and conveniently comprises, as shown, a generator unit 10 surmounted by a fuel hopper 11, a vapourizer 12 and a washing/cooling unit 13 which may be of any suitable type for producing as efficient cleaning of the gas as is conveniently possible. The output from the unit 13 is fed by means of a booster fan 14 either directly to the subsequent petrol vapourizing plant PVP or, more preferably and as shown, to a gas holder 15 from which the latter plant is supplied at a reasonably constant pressure over pipe line 16.

The petrol vapourizer plant PVP is shown in greater detail in Figs. 2 and 3 and comprises a generally cylindrical and stationary outer casing 17 within which rotates, in coaxial relationship, a smaller diameter cylindrical drum 18 secured upon a shaft 19. The drum 18 surrounds a second coaxial drum 20 also secured to the shaft 19 and between the respective outer and inner surfaces of the drums 20 and 18 is disposed an Archimedean screw 21 consisting of a helical web sealed around its inner and outer edges to the two drums.

The Archimedean screw 21 may be of one, two or more start form whereby the end 22 of the rotating drum assembly is formed with one, two or more inlet ports 23 leading to the convolutions of the screw 21. The opposite end or ends of the screw 21 leads to an annular gas chamber 24 from which the gas therein is conducted through ports 25 in a hollow bearing journal 26 into a stationary outlet gas chamber 27 formed between a radial partition 28 spanning the interior of the outermost casing 17 and one end wall 29 of such casing.

The outer casing 17 is closed by wall 30 at the opposite end and is partially filled with water as shown at 31 to a level which is higher than the lowermost point of the inner drum 20 whereby, upon rotation of the drum assembly, gas from the surounding or inlet chamber 32 of the cylinder is trapped and is propelled along the turns of the screw 21 within the drum assembly and is eventually discharged through the hollow bearing journal 26 into the second gas chamber 27.

Petrol delivered from an adjustable feed device 33 is caused to drip onto the uppermost point of the outer surface of the rotating drum 18, being discharged from the lower end of a feed pipe 34 and distributed over the surface of the drum with the aid of a distributor 35 which is secured to the undersurface of the upper region of the outer casing 17. The petrol feed device 33 comprises a rotating disc 36 carrying near its periphery a series of cups 37 in regularly spaced relationship, said cups being disposed so as to dip, when near the lowermost point of their path of revolution, into petrol as shown at 38 in a tank 39 which is closed and is secured upon a framework 40 which also serves to mount the casing 17 and its associated parts. As the cups 37 are raised on their emergence from the petrol 38 in the tank 39 they become tilted to spill the measured quantity of petrol therein into an arcuate mouthed funnel 41 which communicates at its lowermost point by way of a rotatable outlet gland 42 to the aforesaid petrol feed pipe 34.

For the purpose of convenient adjustment of the amount of petrol supplied per revolution of the drum assembly the upper oriffice of this funnel is arranged to be displaceable about the horizontal axis of the gland 42 by means of an external regulator handle 43 so that, by altering the position of such funnel as shown, for example, by the chain-dotted outline in Fig. 3 only a predetermined proportion of the petrol gathered by each cup is directed into the funnel, the remainder being prematurely spilt and automatically returned to the main body of petrol in the tank. Alternatively, the funnel 41 may be provided with an arcuate cover over the mouth thereof, which cover is arranged to be displaceable by means of the regulator handle 43 so that by altering the position of such cover only the supply of petrol into the funnel is controlled as above.

The disc 36 is secured upon a spindle 44 and this is rotated in unison with the shaft 19 by an electric motor 45 mounted upon the framework 40, through the intermediary of suitable belt, chain or other driving connections 46, 47 and 48.

Secured to the shaft 19 between the inlet port end 22 of the rotating drum assembly and the adjacent end wall 30 of the casing 17 is a rotating disc 50. This disc is of a size which nearly fits the interior of the stationary casing and consequently overlies and masks an inlet connection 51 leading from the producer gas plant PG whereby such producer gas initially impinges upon the surface of such disc and has to travel along such surface and over its edge and then down the opposite surface to arrive eventually at the inlet ports 23 of the Archimedean spiral 21.

The lowermost point of the outer casing is conveniently provided with a sludge sump 52 and with suitable water cocks 53, 54 for periodically changing the water and clearing any sludge which has accumulated.

An outlet connection 55 of the gas chamber 27 leads by way of piping 56 to a further gas holder indicated generally at 57 in Fig. 1.

In the operation of the device the producer gas, conveniently at a reasonably stable pressure from the associated gas holder 15 of the producer gas plant PG, is fed to the mixing chamber 32 of the petrol vapourizing plant PVP by way of the inlet connection 51. Simultaneously, petrol is being dropped onto the outer surface of the rotating drum 18 which by reason of its partial immersion in the water filling 31 is wet with the result that the applied petrol forms a widely distributed thin film which is quickly vapourized and mixed with the producer gas. The producer gas in impinging upon the cooled and wetted disc 50 and travelling along its surface and over its peripheral edge, deposits thereon water vapour and the fine particles of solid matter entrained in the gas, with which particles the water filling 31 becomes automatically contaminated.

The mixture of producer gas and vapourized petrol is drawn into the Archimedean screw 21 through the ports 23 and pockets of the gas mixture are propelled along the turns of the screw and eventually discharged under some degree of pressure into the outlet gas chamber 27.

The turbulence created by the rotating drum assembly and the continual passage of the gas mixture through the sealing water produces an effective washing of the producer gas component of the mixture before its eventual delivery to the gas chamber 27 while the wet carburation type of device used for effecting vapourization of the applied petrol produces the requisite density of petrol vapour for admixture with the producer gas without recourse to any heating or other vapourizing aids. In this specification vapourization of petrol by the wet carburation method is to be understood to mean a method in which a comparatively large surface is continually moistened with water and liquid petrol is applied thereto so as to spread out in a thin and substantially even film.

While the arrangements shown constitute a preferred embodiment of apparatus according to the invention, it will be apparent that other hydrogen-containing gases such as town gas or coal gas may be suitable for use instead of producer gas where a supply of such other gas is available, and that other forms of producer gas generating plant and gas pumping means may be employed.

I claim:
1. Apparatus for producing a combustible gas mixture comprising a mixture of a hydrogen-containing gas such as producer gas, coal gas or town gas with petrol vapour, comprising the combination of a casing enclosing a mixing chamber for said hydrogen containing gas and the petrol vapour, an inlet at one end of said casing for the hydrogen-containing gas, an outlet in another part of said casing for the gas-vapour mixture, a shaft journalled in said casing, driving means for said shaft, a drum mounted on said shaft and partially immersed in a water bath within said casing, means for applying petrol to the constantly wetted outer surface of said drum, convolutions within said drum adapted to draw pockets of petrol vapour-gas mixture through the water bath by rotation of said drum, and a baffle disc fast on the drum shaft and situated between the rotary drum and the casing inlet, the said baffle disc being partially immersed in the water bath to present a constantly wetted and cooled surface to the incoming hydrogen-containing gas before substantial mixing with the petrol vapour.

2. In an apparatus for the production of a combustible gas mixture of a hydrogen-containing gas such as producer gas, coal gas or town gas with petrol vapour, the combination of an enclosing casing defining a mixing chamber, a water bath in said chamber, means for vaporizing petrol within the said casing, a gas inlet at one end of said casing, means for supplying a hydrogen-containing gas to said inlet, an outlet for the gas-vapour mixture in said casing, a shaft journalled in the casing, an Archimedean screw mounted on said shaft for drawing pockets of vapour-gas mixture through said water bath, and a smooth surfaced disc mounted on said shaft and positioned between the said inlet for the hydrogen-containing gas and the Archimedean screw, said baffle disc being partially immersed in said water bath to present a constantly cooled and wetted surface inclined to the direction of the incoming hydrogen-containing gas to remove water vapour and entrained impurities therefrom before substantial mixing with the petrol vapour.

3. Apparatus for enriching hydrogen-containing gas comprising the combination of a casing enclosing a mixing chamber for said hydrogen containing gas and the petrol vapour, an inlet at one end of said casing for the hydrogen-containing gas, an outlet in another part of said casing for the gas-vapour mixture, a shaft journalled in said casing, driving means for said shaft, a drum mounted on said shaft and partially immersed in a water bath within said casing, means for applying petrol to the constantly wetted outer surface of said drum, convolutions within said drum adapted to draw pockets of petrol vapour-gas mixture through the water bath by rotation of said drum, and a baffle disc fast on the drum shaft and situated between the casing inlet for the hydrogen-containing gas and the rotary drum, said baffle disc being partially immersed in the water bath to present a constantly wetted and cooled surface inclined to the incoming hydrogen-containing gas.

References Cited in the file of this patent
UNITED STATES PATENTS

| Number | Name | Date |
| --- | --- | --- |
| 551,695 | Slocum | Dec. 17, 1895 |
| 873,250 | Lea | Dec. 10, 1907 |
| 1,345,131 | Cleworth | June 29, 1920 |
| 1,637,187 | Harris | July 26, 1927 |
| 1,730,410 | Dennison | Oct. 8, 1929 |
| 1,731,924 | Engelke | Oct. 15, 1929 |
| 1,819,839 | Grant | Aug. 18, 1931 |
| 2,513,769 | White | July 4, 1950 |

FOREIGN PATENTS

| Number | Country | Date |
| --- | --- | --- |
| 931 | Great Britain | Jan. 13, 1911 |
| 7,470 | Great Britain | Mar. 20, 1909 |
| 519,781 | France | June 15, 1921 |